April 24, 1934.  G. H. A. ALLEN  1,955,937
SPIKED ROLLER
Filed Sept. 12, 1932
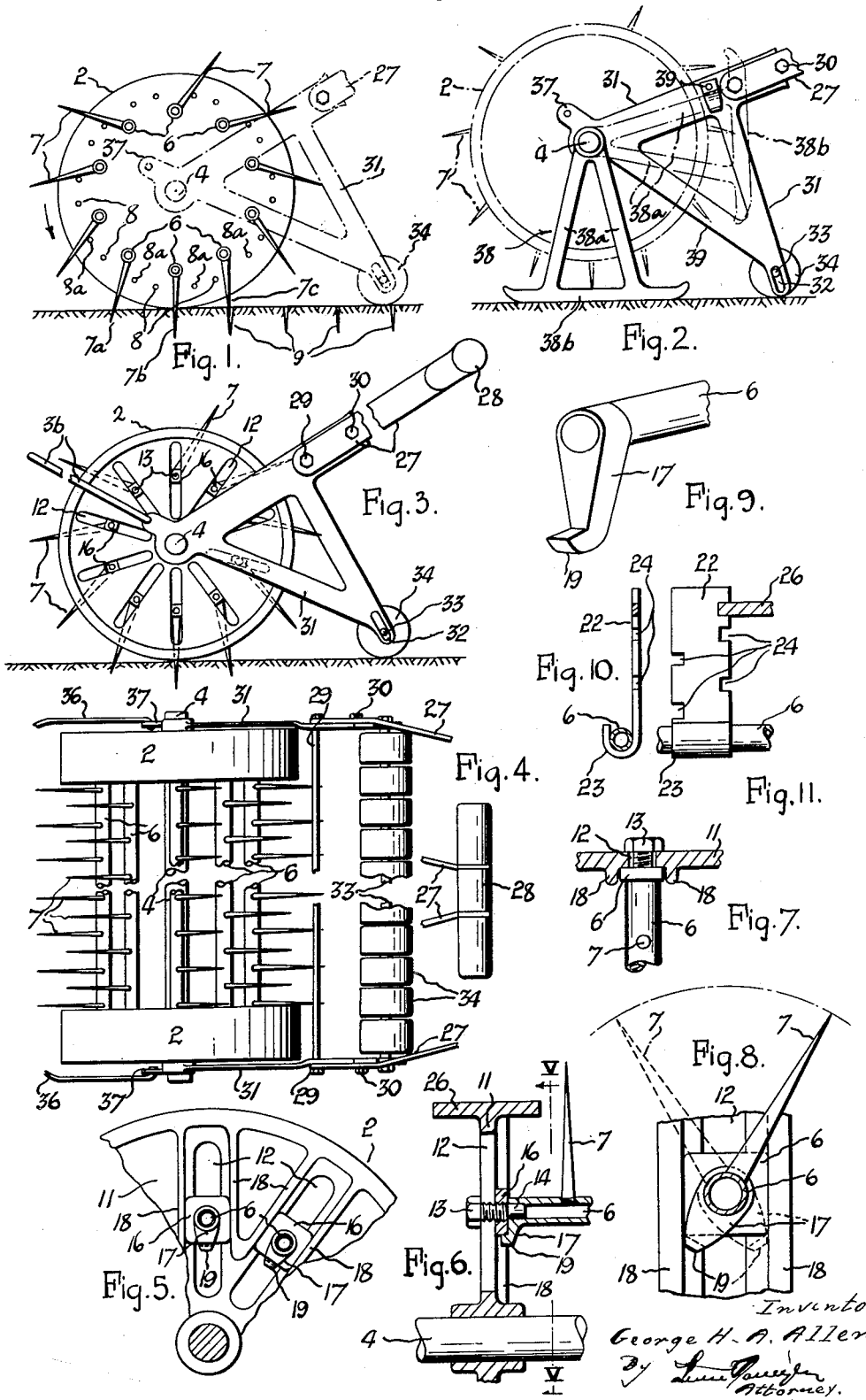

Patented Apr. 24, 1934

1,955,937

UNITED STATES PATENT OFFICE 1,955,937

SPIKED ROLLER

George Henry Albert Allen, Northcote, Victoria, Australia

Application September 12, 1932, Serial No. 632,859
In Australia October 9, 1931

9 Claims. (Cl. 97—52)

This invention relates to devices of the type comprising a roller carrying spikes which are adapted to puncture the turf and soil of bowling greens, putting greens and the like for the purpose of loosening and aerating the soil and thereby stimulating the growth of the turf and providing drainage for excess moisture.

Such devices have hitherto possessed the objection that the spikes, being rigidly mounted or affixed to the roller, have been liable to tear or uproot the turf and soil, thereby detrimentally affecting the surface of the turf and impairing the playing qualities thereof.

The primary object of the present invention is to provide an improved device of the type referred to in which the above mentioned objection is avoided and the spikes, instead of tearing or uprooting the turf and soil, are adapted to enter and withdraw from the ground in such a manner as to leave a substantially straight and clean puncture so that whilst the soil is effectively loosened and aerated the desirable even surface of the green is preserved.

The chief charactristic of the invention resides in that the spikes are adapted to pivot or swing in relation to the roller on which they are mounted so that as the roller rotates the spikes are caused to yield from their normal positions and to penetrate and to be withdrawn from the ground in the direction of their length so as to leave substantially vertical or straight and clean holes or punctures as aforesaid.

Another object of the invention is to provide an improved construction of roller for carrying the spikes as above mentioned and an improved arrangement of a plain transport roller on which the implement may be transported with the spiked roller raised out of action.

The above and other features of the invention will, however, be better understood from the following description of a suitable practical embodiment of the invention.

Referring to the drawing which forms part of this specification—

Figure 1 is a somewhat diagrammatic view illustrating the action of the pivoted spikes as they penetrate and are withdrawn from the ground during rotation of the roller.

Figure 2 is a side elevation of a machine in accordance with the invention in which certain parts are broken away and in which the spiked roller is shown supported clear of the ground by a stand.

Figure 3 is a side elevation of the machine in which parts are broken away for convenience of illustration.

Figure 4 is a plan view.

Figure 5 is an enlarged fragmentary view taken on the line V—V in Figure 6.

Figure 6 is a fragmentary section of one of the end discs of the roller showing means for mounting the oscillating tubes carrying the spikes.

Figure 7 is a fragmentary section of one of the end discs.

Figure 8 is an enlarged detail view showing how the swinging movements of the spikes are limited.

Figure 9 is a perspective view of an end of a spike carrying tube or rod.

Figures 10 and 11 illustrate a gauge adapted to ensure uniform assembly and radial adjustment of the spike carrying tubes.

A device in accordance with this invention includes a roller or like structure comprising two end discs or wheels 2 of suitable diameter and width of tread which may be interconnected by a series of circumferentially spaced longitudinal rods or bolts spaced inwardly from the rims or outer peripheries of the discs and forming axes for oscillating tubes or sleeves upon which rows of spikes are secured.

As shown in the drawing, however, the wheels 2 are mounted on an axle 4 and are bridged or spanned by rods or tubes 6 adapted, as hereinafter described, to oscillate about their axes to a limited extent so that the spikes 7, which are secured in rows to said tubes, swing or turn therewith. The oscillating movements of the tubes and spikes may be limited by suitable stops as indicated diagrammatically at 8 and 8a in Figure 1.

It will be evident that during rotation of the roller or like structure formed by the discs 2 and the tubes or rods 6, the spikes 7 on each tube 6, on entering the ground, will swing forwardly or in a direction opposite to that of the rotation of the roller so that they penetrate the ground in the direction of their length and, as the roller continues to advance, are withdrawn out of the ground also in the direction of their length, instead of at an angle thereto as is the case with spikes fixed to the roller in the usual manner.

Before re-entering the ground the spikes will, when at about the upper arc of the roller, swing by gravity in the reverse direction until brought to rest against the respective stops 8a. This ability of the spikes or spike carriers to swing freely in both directions, and the provision of stops for limiting such swinging movements, enables the device to operate effectively when travelling in both directions. The direction of travel of the device is thus instantly reversible at any time without adjustment, which is of particular advantage in practice. Furthermore, upon reversing the direction of travel, the spikes will not enter the punctures formed in the turf during travel in the preceding direction, but will penetrate the ground at positions spaced longitudinally between the previously formed punctures.

The operation of the device is indicated in Figure 1, attention being directed particularly to the three representations of spikes at the lower arc of the roller. It is assumed that the spike in position 7a has just entered the ground and, with its tube 6, has swung slightly forwards away from the associated stop 8a. During continued advance of the roller the spike comes into position 7b wherein it has swung further forwardly about its pivot and has penetrated to the maximum extent into the ground, the swinging movement of the spike permitting its straight or lengthwise penetration into the ground to thereby form a substantially vertical hole or puncture as at 9. During further advance of the roller the spike is gradually withdrawn from the puncture whilst continuing to swing forwards towards stop 8 as indicated at 7c, thereby leaving the puncture substantially straight and clean.

The spikes of the various rows are preferably arranged in staggered formation relative to those of other rows so that succeeding spikes will not enter the holes formed by the spikes in advance, the punctures 9 formed by the spikes being thus distributed uniformly over the area treated.

The construction of the roller as above mentioned has a distinct advantage over existing appliances for the same purpose, in that it permits of the use of a roller of sufficient weight to effectively force the spikes into the ground without undue pressure on the turf and consequent liability of closing the punctures and undesirably compacting the soil.

Figures 5 to 8 illustrate a suitable manner of mounting the spike carrying tubes or rods 6 whereby they may oscillate within suitable limits and also whereby they may be adjusted radially to permit of variation in the depth of penetration of the spikes to suit requirements. According thereto the web 11 of each disc or wheel is provided with radial slots 12 conforming in number to the tubes 6 and a stud or screw 13 having a plain inner end or bearing portion 14 extends through each slot and a nut or block 16 at the inner face of the web, the plain end portion of each stud projecting into an end of the respective tube 6 and forming a bearing or trunnion thereof. In order to limit the swinging movements of the tubes, each end of each tube may have an outstanding stop member or arm 17 located between stop faces 18 extending one at each side of the respective slot 12 at the inner face of the disc 2. The stop faces 18 may advantageously take the form of radially extending ribs formed integral with the respective disc as shown. If desired each stop member may have an outwardly extending foot portion 19 adapted to engage the respective ribs 18 according to the direction of swing of the spikes and thus limit their movement as indicated in Figure 8.

To adjust the depth of penetration of the spikes it is merely necessary to slacken the studs 13 at each end of the tubes whereupon the assembly may be adjusted lengthwise of the radial slots 12 and the studs then tightened. The ribs 18 may provide radial guideways for the nuts 16 which are preferably of square form and a close fit in their guideways and are thus prevented from turning when the studs are being slackened or tightened.

To ensure uniform and accurate assembly and radial adjustment of the spike carrying tubes a gauge device as seen in Figures 10 and 11, may be used. This device may consist of a metal or like strip 22 bent into substantially J form, the lower end portion 23 being adapted to accommodate a tube 6 while either or both side edges of the strip may have longitudinally spaced notches or recesses 24 for receiving an edge portion of the tread rim 26 of the end discs or wheels. It will be evident that by utilizing two of such gauge devices one at each end of the tubes, the latter may be readily assembled and radially adjusted to ensure that all of the spikes have the same amount of projection and depth of penetration.

The spikes may obviously be of any suitable shape. For instance, they may be round or oval in cross section or they may be knife shape. They may be secured to the oscillating rods or tubes in any suitable manner such, for instance, as by being screwed thereto as indicated in Figure 6.

The propelling means may include two side bars 27 extending downwardly and diverging forwardly from a handle 28, the front ends of the handle bars being adjustably connected, as by a cross bolt 29 and set screws 30, to the upper end or corner portions of brackets or plate members 31 preferably of triangular form. The front end or corner portion of each bracket may be apertured to receive the respective end portion of the axle 4 while the rear or lower corner portion of each bracket may have a longitudinal slot 32 to receive the respective end portion of an axle 33 of a comparatively small diameter transport roller 34 which extends parallel with and behind the spiked roller. The roller 34 may track over the ground while the device is in use or it may be raised slightly clear of the ground. In any case when it is desired to transport the device without causing the spikes to penetrate the ground the handle is depressed so that the slotted portions 32 of the brackets 31 may slide downwardly in relation to the roller axle 33 whereby the spiked roller is swung with the brackets clear of the ground, while roller 34 contacts with the ground. The same procedure may be adopted when turning the device and to enable it to turn in a comparatively small radius and without drag, the roller 34 is preferably of sectional form comprising a number of independent roller sections freely mounted upon the axle 33 so that the sections may have different speeds when turning the device.

An advantage attendant upon the roller axle 33 being free to move in the slots 32 of the brackets 31 is that thereby the roller 34 (or roller sections) does (or do) not exert any material pressure upon the turf or the like and will not therefore close the punctures 9 or compact the soil. The roller sections are preferably of wood or other light construction in order to reduce their weight and consequent pressure to a minimum.

The handle bars 27 may be angularly adjusted in relation to the brackets 31 by being swung about the axis furnished by cross bolt 29 and may be set in any convenient inclination by means of the set screws 30.

A bridle 36 may be detachably connected at its rear ends to lugs 37 of the brackets 31 to enable the device to be hauled from the front as well as pushed from the rear when so desired.

To enable the device to stand idle with the spikes clear of the ground two stands 38 may be mounted one upon each end of the axle 4 as in Figure 2. Each stand may have a boss portion freely encircling an end portion of axle 4, and two legs 38a which diverge outwardly and are bridged by a shoe portion 38b with curved ends which, as shown in unbroken lines in Figure 2, rests upon the ground when it is desired to support the spike roller clear of the ground. When not in use each stand may be swung about the axle into the broken line position and retained in position by a spring clip 39 or the like co-operating with a leg of the stand and the respective bracket 31.

Having now described my invention what I claim as new and desire to secure by Letters Patent is—

1. In a turf or like puncturing device of the character described a roller having two end discs, bearing members radially adjustable on said discs, and a series of spike carrying rods adapted to extend between the discs and rotatably supported at their ends by said bearing members.

2. In a turf or like puncturing device of the character described, a roller having two end discs provided with circumferentially spaced substantially radial guideways, spike carrying rods adapted to extend between said discs in alignment with pairs of opposite guideways, and supporting members adjustable lengthwise of said guideways for supporting said rods.

3. In a turf or like puncturing device of the character described, a roller having two end discs provided with curcumferentially spaced substantially radial slots, trunnion members extending freely through said slots and projecting inwardly from the inner face of one disc towards the other disc, spike carrying rods adapted at their ends to be supported by said trunnions, and means whereby the trunnions may be made fast to the discs.

4. In a turf or like puncturing device of the character described, a roller having two discs mounted on opposite ends of an axle, said discs being provided with circumferentially spaced substantially radial slots, trunnion members in the form of studs each having a head, and a screwed shank terminating at its outer end in a plain circular portion, the shanks of said trunnion members extending through the slots, nuts encircling the screwed shanks at the inner faces of the discs, and spike carrying rods adapted at their ends to fit rotatably around the plain circular ends of said trunnions.

5. A turf or like puncturing device of the character described comprising a roller having spikes mounted thereon adapted to penetrate the ground, a non-spiked roller of comparatively small diameter extending parallel to the spike carrying roller and adapted to track upon the ground behind same, and propelling means including two brackets adapted at their forward ends to rotatably receive the end portions of the spiked roller axle, said brackets having rearwardly depending arms provided with longitudinally extending slots to freely accommodate the end portions of the rear roller axle, and a propelling handle connected to said brackets.

6. A device as claimed in claim 5 wherein said rear roller comprises a plurality of independent roller sections which are freely mounted upon the roller axle.

7. A turf or like puncturing device of the kind indicated, comprising a roller having spaced discs, a number of rods extending longitudinally of the roller in circumferentially spaced relationship between said discs, spikes mounted on said rods so that they may oscillate while being carried around with the rods during rotation of the roller, whereby the spikes, while entering and leaving the ground, are caused to swing in a direction opposite to that of rotation of the roller so that they penetrate and are withdrawn from the ground substantially in the direction of their length, and means for radially adjusting said rods in relation to said roller in order to vary the depth of penetration of the spikes.

8. A turf or like puncturing device of the kind indicated, comprising a roller having spaced discs, a number of rods extending longitudinally of the roller in circumferentially spaced relationship between said discs, bearing members carried by said discs for rotatably supporting said rods, spikes secured to said rods, and means for radially adjusting said bearing members in relation to said discs in order to vary the depth of penetration of said spikes.

9. A turf or like puncturing device of the kind indicated, comprising a roller having spaced discs, a number of rods extending longitudinally of the roller in circumferentially spaced relationship between said discs, means for rotatably supporting said rods so that they are free to turn about their axes while being carried around with the roller, a series of spikes secured to said rods and projections on said rods aligned with stop faces on said discs to limit turning movement of said rods.

GEORGE HENRY ALBERT ALLEN.